United States Patent [19]

Kato et al.

[11] 4,403,322

[45] Sep. 6, 1983

[54] VOICE SIGNAL CONVERTING DEVICE

[75] Inventors: Takao Kato, Yokohama; Tetsuo Takemura, Kamakura; Akira Horiki; Noboru Watanabe, both of Yokohama, all of Japan

[73] Assignee: Hitachi, Ltd., Tokyo, Japan

[21] Appl. No.: 279,813

[22] Filed: Jul. 2, 1981

[30] Foreign Application Priority Data

Jul. 2, 1980 [JP] Japan ................................ 55/89204

[51] Int. Cl.³ ............................................. H04J 3/12
[52] U.S. Cl. .............................. 370/110.1; 179/2 DP
[58] Field of Search ......................... 370/110.1, 111; 179/2 DP; 340/347 DD

[56] References Cited

U.S. PATENT DOCUMENTS 3,549,814  12/1970  Jaeger et al. ................... 370/110.1
4,143,242   3/1979  Horiki ............................ 370/110.1
4,354,265  10/1982  Nyberg et al. ................. 179/2 DP

FOREIGN PATENT DOCUMENTS 2828602  12/1979  Fed. Rep. of Germany ... 370/110.1

55-34637   8/1980  Japan .

Primary Examiner—Douglas W. Olms
Attorney, Agent, or Firm—Antonelli, Terry & Wands

[57] ABSTRACT

A voice signal converting device is adapted for a digital communication network which handles digitized voice signals and data signals simultaneously or equally. A bit for discriminating whether a signal in communication is a voice signal or a data signal is applied in a digital signal channel. The voice signal converting device is connected to a digital communication path to detect the discrimination bit from the incoming signal in such a manner that when a bit group corresponding to the discrimination bit represents the voice signal, the bit group is converted into a predeterminedly correlated bit group and delivered out and when the bit group corresponding to the discrimination bit represents the data signal, this bit group is delivered out in its original form. Consequently, even when the voice signal and the data signal coexist in one communication, speech quality of the voice signal and bit integrity of the data signal can be guaran 10 Claims, 7 Drawing Figures FIG. 1a
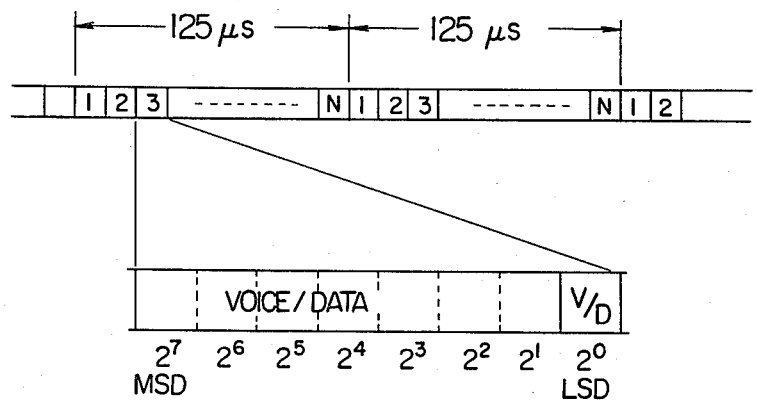
FIG. 1b
| V/D | VOICE/DATA |
|---|---|
| $2^0$ | $2^1 \sim 2^7$ |
| 0 | VOICE |
| 1 | DATA |
FIG. 2
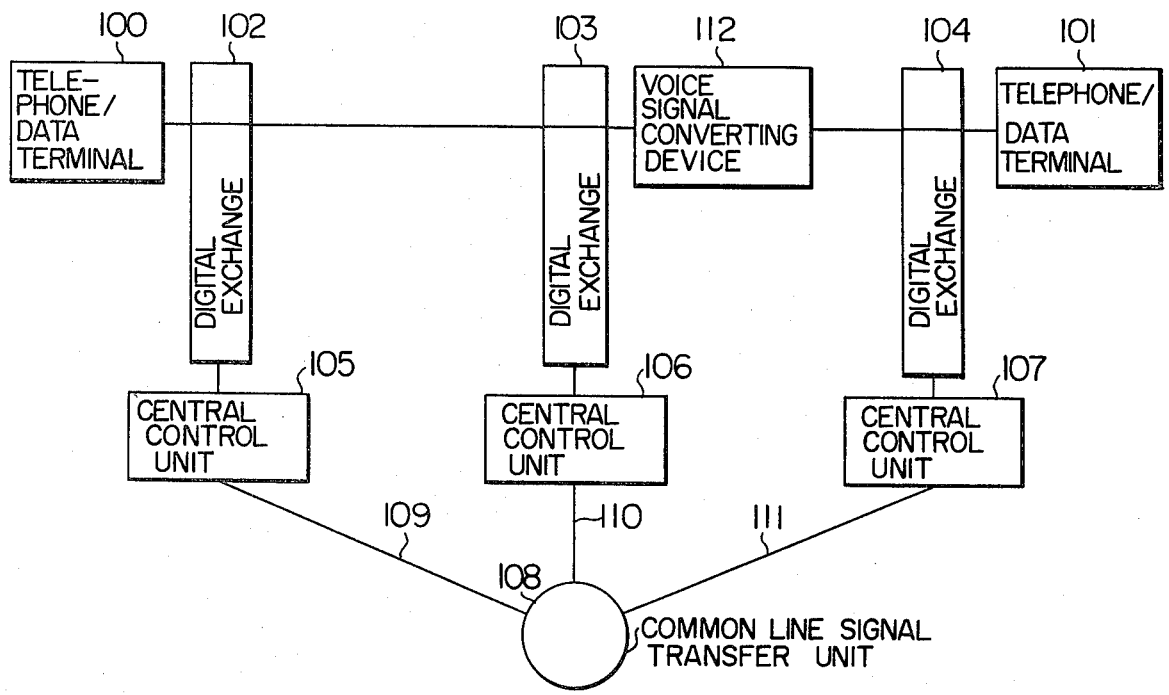

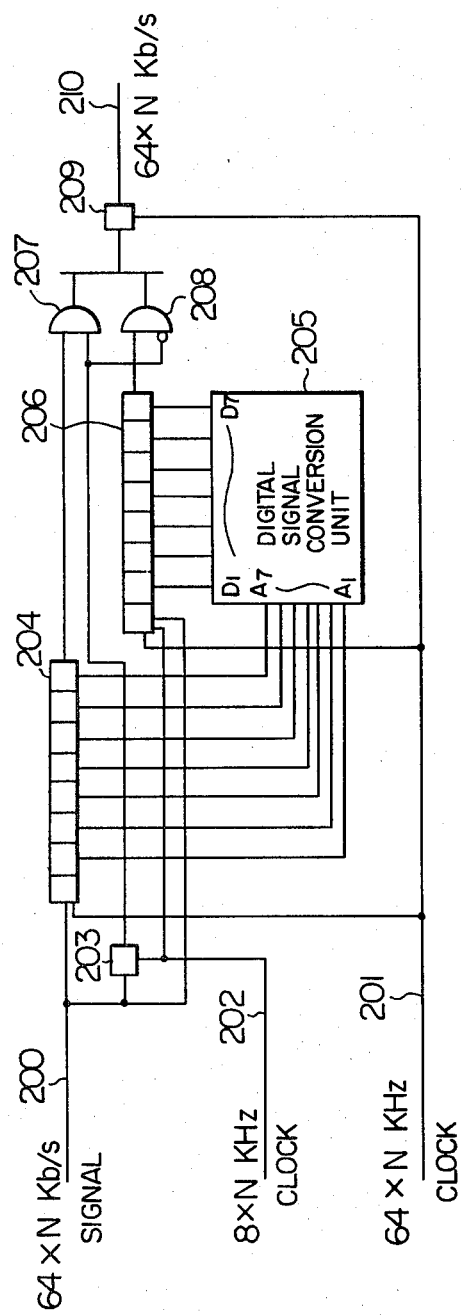
FIG. 3
FIG. 4a  201 (64×N KHz)
FIG. 4b  202 (8×N KHz)
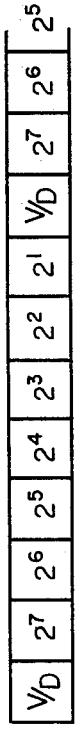
FIG. 4c  200 (64×N Kb/s SIGNAL)

VOICE SIGNAL CONVERTING DEVICE

BACKGROUND OF THE INVENTION

1. Field of the Invention

This invention relates to a digital communication network in which digitized voice signals and data signals are treated equally or simultaneously, and more particularly to a voice signal converting device for use in such a digital communication network which can assure bit integrity of the data signals and guarantee speech quality of the voice signal.

2. Description of the Prior Art

Telephone networks set up primarily for voice communication have gained their extensive service area and accordingly have had many applications in non-telephone service communications such as a data communication and a facsimile. In particular, currently developed digitization in telephone communication networks promotes the advent of a digital link of the end to end type which makes way for availability of a data communication in the form of a digital voice channel of, for example, a 64 Kb/s rate. This rate is highly beneficial as compared with a maximum rate of 9.6 Kb/s resulting from a data communication using an existing analog voice channel of 4 KHz, and desirability has been concentrated to its realization.

However, in order to accomplish a digital data communication using the digital link, it is necessary to assure bit integrity in which a bit strip of digital data is conserved within a telephone communication network.

On the other hand, desired speech quality of voice communications is sometimes out of guarantee within the network in which bit integrity is realized. For example, if differently coded systems, respectively based on PCM $\mu$-law and PCM A-law which are widely used as coding laws for voice signals in existing telephone networks, are directly connected, speech quality is disadvantageously degraded. In other words, when a subscriber in an area using the $\mu$-law communicates with a subscriber in an area using the A-law, signals encoded and digitized pursuant to the $\mu$-law are decoded into analog signals pursuant to the A-law within the network meeting bit integrity with a result that the original voice cannot be restored, thus imposing fatal inconveniences upon the communication.

A countermeasure for this problem is to provide a device for $\mu$-A law conversion at a proper site within the network (generally at an international gate office). In addition to necessity of the $\mu$-A law conversion, for guarantee of speech quality, converting devices for the voice signal such as an echo suppressor, a digital PAD and a band compressor are required which are necessarily inserted in the digital link.

Accordingly, when it is desired to equally or simultaneously treat both the digitized voice signal and data signal within a digital communication network, the use of a net voice channel in the data communication is prone to inconveniences and an expedient to solve this problem is required.

It is conceivable that an approach to the above problem is to select a digital link corresponding to the type of calls on the basis of call classification, namely, corresponding to either telephone call or data call and then to insert a necessary converting device in the link corresponding to the telephone call. However, this approach suffers from inconvenience that dynamic switching between voice and data during communication cannot be effected. In other words, universal versatility in services is important in a digital communication network and when a telephone terminal and a data terminal are connected through a single digital subscriber line for transmission and reception of digital voice signal and data signal between terminal units, it is desirable to realize dynamic switching between voice and data during communication. The above desirability, however, cannot be attained by either the insertion/removal or the activation/deactivation of the $\mu$-A law converting device in accordance with the type of call and the terminal unit or the area to be communicated.

A conceivable approach to this problem is such that during communication, a subscriber handles to issue to an exchange a signal for switching between voice communication and data communication, and this switching signal is carried about on a common line signal network so as to control a voice signal converting device at an international gate office. However, this expedient is disadvantageous in that a controlling process is required of the exchange each time switching between voice communication and data communication is effected, resulting in excessive load on the exchange while the voice/data switching governed by the subscriber is difficult in synchronization with the controlling of the voice signal converting device.

SUMMARY OF THE INVENTION

An object of this invention is to provide a highly reliable voice signal converting device which can guarantee speech quality of digitized voice signals and at the same time, assure bit integrity of data signals.

Another object of this invention is to provide a voice signal converting device which can assure a number of repetitious switchings between the voice signal and the data signal within one communication as desired so that a digital communication path can be used effectively.

Still another object of this invention is to provide a highly versatile and economic voice signal converting device which can readily be applied to a site within a network calling for the voice signal conversion, without affecting the data signal.

The digitization of telephone network is directed to setup of a 64 Kb/s channel by 8-bit coding but with realization of a digital 1 link, a 7-bit coding is sufficient for assuring speech quality. Thus, according to the present invention, a digital communication network which handles digitized voice signals and data signals equally or simultaneously is materialized by setting, within a group of bits representative of a digital signal channel, a specified bit for discriminating whether the corresponding bit group represents a voice signal or a data signal, and by utilizing a voice signal converting device having means for converting a bit group in a digital signal channel into a predeterminedly correlated bit group, means for detecting the specified discriminating bit, and means responsive to results of detection by the detecting means so that when the bit group corresponding to the specified discriminating bit represents the voice signal, the correlated bit group resulting from the conversion by the converting means is selected and delivered out and when the bit group corresponding to the specified discriminating bit represents the data signal, this bit group in its original form is selected and delivered out.

BRIEF DESCRIPTION OF THE DRAWINGS

FIG. 1a is a diagrammatic representation showing one example of bit allotment in a signal according to the invention.

FIG. 1b illustrates a relationship between the V/D bit and the content of information to be transmitted.

FIG. 2 is a block diagram showing one example of a digital communication network incorporating a voice signal converting device according to the invention.

FIG. 3 is a circuit diagram showing one embodiment of the voice signal converting device according to the invention.

FIGS. 4a to 4c show a time chart of signals in the circuit illustrated in FIG. 3.

DESCRIPTION OF THE PREFERRED EMBODIMENTS

FIG. 1a illustrates a transmission format of information in a time division multiplex communication path of an 8 KHz sampling N-channel multiplex and allotment of a "V/D bit" for discriminating a voice signal and a data signal. For a 2 Mb/sec highway, N is 32 and for an 8 Mb/sec highway, N is 128. Individual channels are multiplexed at a period of 125 $\mu$sec and occupy a time slot of 125/N $\mu$sec within the 125 $\mu$sec period. Each time slot is divided into eight as shown in FIG. 1a and adapted to carry a PCM 8-bit code. In one embodiment illustrated herein, a $2^0$ bit corresponding to the LSD (Least Significant Digit) is defined as the V/D bit for discrimination of voice and data signals. When the specified V/D bit is "0", the corresponding 7 bits of $2^1$ to $2^7$ represent a PCM coded voice and when "1", the corresponding 7 bits carry a data as illustrated in FIG. 1b.

For the setting of the V/D bit for discrimination of voice and data signals, a discrimination bit generator circuit compatible with the type of a calling terminal unit may be provided for each subscriber, and a code corresponding to the type of the calling terminal unit, that is, depending on a telephone terminal or a data terminal, may be allotted to the $2^0$ bit in each time slot.

FIG. 2 shows, in block form, an example of a digital network incorporating a voice signal converting device according to the present invention. The digital network comprises voice/data composite terminals 100 and 101 each having a duplex function of a telephone terminal and a data terminal, a digital exchange 102 handling a $\mu$-law voice, an international digital gate exchange 103, a digital exchange handling an A-law voice, central control units 105 to 107 for controlling the exchanges 102 to 104, respectively, a common line signal transfer unit 108, common line signal links 109 to 111, and a voice signal converting device 112 having a $\mu$-A conversion function.

It is assumed that the voice/data composite terminal 100 communicates with the voice/data composite terminal 101. When the terminal 100 originates a call and dials a selected number in the known manner, the central control unit 105 transmits the selected number and the like to the common line signal transfer unit 108 via the link 109. This information is relayed to the central control units 106 and 107 via the links 110 and 111. If the central control unit 106 judges from this information that an area to be communicated has the A-law coding, a digital multiplex junction line connected with the voice signal converting device 112 having the $\mu$-A conversion function is selectively brought into connection. Also, the central control unit 107 selectively brings the terminal 101 into connection so that the path between the terminals 100 and 101 is established through the exchanges 105 to 107.

In this case, the same procedure is taken to establish the path regardless of the service call being a telephone call or a data call. More particularly, the voice signal converting device 112 is incorporated with a detector for detection of the V/D bit shown in FIG. 1 to guarantee the bit integrity when the code of the V/D bit is "1" or to guarantee the speech quality by effecting the A-$\mu$ law conversion when that code is "0", thereby ensuring that the transmission of voice and data can be accomplished through the same path connection.

Accordingly, there is no need of carrying about the switching signal indicative of the type of call on the common line to cause an international gate office to separate the connection path with interposition of the $\mu$-A converting device and the connection path without interposition thereof in accordance with the type of call and the controlling for exchange will therefore be simplified greatly. In addition, the signal on transmission is successively judged by the converting device 112 as to whether it is a voice signal or a data signal and a procedure in compliance with the results is taken, so that even when repetitious switchings between the voice signal and the data signal occur during one communication, not only change of the connection path is unnecessary but also the switching signal is not required to be carried about on the common line signal network to cause the exchange to perform the controlling procedure for each switching.

A practical circuit arrangement of the voice signal converting device 112 shown in FIG. 2 and its operation will be described.

FIG. 3 shows an exemplary arrangement of the voice signal converting device with the A-$\mu$ law conversion function shown in FIG. 2, and FIGS. 4a to 4c show time charts of signals appearing in the FIG. 3 arrangement.

Applied to the device as shown in FIG. 3 are a signal of $(64 \times N)$Kb/sec via a time division multiplex communication path 200 of N-channel multiplex, a clock signal of $(64 \times N)$KHz via a lead 201 and a clock signal of $(8 \times N)$KHz via a lead 202, timings of these signals being seen in FIGS. 4a to 4c. A latch 203 in the form of a flip-flop circuit is adapted to latch the voice/data discrimination bit or V/D bit contained in the $(64 \times N)$ Kb/sec in response to the $(8 \times N)$KHz clock signal which is synchronized with the allotment of the V/D bit. An 8-bit shift register 204 adapted to shift the incoming signal on the communication path 200 without alternation produces an 8-bit delayed output. The shift register is also used as a series-parallel conversion circuit. A digital signal converting unit 205, for example, in the form of a 7-bit ($2^7$ words) read only memory is supplied at its terminals $A_1$ to $A_7$ with an address input constituted by 7 bits of $2^1$ to $2^7$ out of 8 bits set in the shift register 204. This memory 205 accommodates, for example, a code conversion table for receiving the 7-bit address input in terms of the A-law at the terminals $A_1$ to $A_7$ and producing on terminals $D_1$ to $D_7$ a 7-bit data output in terms of the $\mu$-law corresponding to that address. Accordingly, in response to the 7-bit input representative of the voice signal encoded pursuant to the PCM A-law, the 7-bit output representative of the voice signal encoded pursuant to the corresponding PCM $\mu$-law is obtained. An 8-bit shift register 206 is used as a parallel-serial conversion circuit which sets the 7-bit output from the terminals $D_1$ to $D_7$ of the memory 205 in response to the (8×N)KHz clock signal fed via the lead 202, directly sets the remainder of one bit ($2^0$ bit) indicative of the V/D bit and delivers out the contents as a series output in response to the (64×N)KHz clock signal fed via the lead 201. AND gates 207 and 208 serving as selecting gates are controlled by the V/D discrimination bit latched at the flip-flop 203 so as to select the contents of either the shift register 204 or 206. The selected contents are set in an output register 209 and then sent to an outgoing time division multiplex communication path 210 as the (64×N) Kb/sec signal.

To specifically describe the operation of the above arrangement, when an incoming data signal on the communication path 200 is received by the device, 8 bits consisting of a V/D bit and 7 bits of $2^7$ to $2^1$ in advance of the V/D bit are sent to the shift register 204 and at the same time, the V/D bit is set in the flip-flop 203. Since the V/D bit is now "1" indicating that the leading $2^7$ to $2^1$ bits represent the data signal, the AND gate 207 is enabled by the output of the flip-flop 203 to set the contents of the shift register 204 in the output register 209. The state "1" of the output of the flip-flop 203 remains unchanged until the subsequently alloted V/D bit occurs and thus the selection of the AND gate 207 continues until the shift register 204 completes the transmission of a bit group corresponding to the V/D bit in response to the (64×N)KHz clock signal. In this manner, when the code of the V/D bit is "1", the incoming signal on the communication path 200 is simply delayed by 9 bits and thereafter delivered to a communication path 210 without undergoing any change in format of the bit strip.

Next, when an incoming voice signal on the communication path 200 is received, 8 bits inclusive of a V/D bit are set in the shift register 204 and at the same time the V/D bit is set in the flip-flop 203, as in the case of the previous data signal. Since the V/D bit is now "0" indicating that the leading 7 bits of $2^7$ to $2^1$ represent the voice signal, the AND gate 208 is enabled by the output of the flip-flop 203 to set the contents of the shift register 206 in the output register 209. Due to the fact that in response to the (8×N)KHz clock signal, the shift register 206 is set with the V/D bit as well as output information from the digital signal converting unit 205 which receives at the terminals $A_1$ to $A_7$ the 7 bits of the shift register 204 as address information and produces at the terminals $D_1$ to $D_7$ a 7-bit output resulting from the A-$\mu$ law conversion of the address information, this converted signal is set in the output register 209. The state "0" of the output of the flip-flop 203 remains unchanged until the subsequently alloted V/D bit occurs and thus the selection of the AND gate 208 continues until the shift register 206 completes the transmission of a bit group corresponding to the V/D bit in response to the (64×N)KHz clock signal. In this manner, in the case of the V/D bit code being "0" where the leading 7 bits of $2^7$ to $2^1$ represent the voice signal, the incoming signal on the communication path 200 is subjected to the A-$\mu$ law conversion at the device and thereafter delivered to the communication path 210.

While in the foregoing embodiment the voice signal converting device has a function to convert a voice signal pursuant to the A-law coding system into a voice signal pursuant to the $\mu$-law coding system, a voice signal converting device may obviously be realized which performs a voice signal coding system conversion from $\mu$-law to A-law, in a similar manner by simply changing the code conversion table in the digital signal converting unit. Obviously, the converting device may also be applied to voice signal conversion utilizing the echo suppressor, digital PAD, and band compressor. Further, the device of the invention may be inserted in desired sites calling for the voice signal conversion, and necessary exchange units may be inserted selectively in the path connecting the terminal units, as desired.

Although in the foregoing embodiment the $2^0$ bit corresponding to the LSD of 8 bits in one time slot is allotted to the V/D bit for voice/data discrimination and the leading 7 bits are judged by this V/D bit as to whether it is a voice signal or a data signal, the allotment for the V/D bit is optional. For example, a V/D bit ($2^0$ bit) which leads by one time slot may be used to discriminate if 7 bits ($2^7$ to $2^1$ bits) in the retarding time slot represent a voice signal or a data signal. Further, the digital signal is not limited to the format of 1-bit V/D discrimination code and 7-bit voice or data code as described above. For example, since, depending on the type of an end to be communicated, the voice signal conversion is sometimes unnecessary or speech quality of an 8-bit signal is sometimes required, a 64 Kb/sec voice service, a 64 Kb/sec data communication or a 56 Kb/sec voice/data communication may be designated upon setting call, whereby for the 64 Kb/sec voice service, the necessity for the signal conversion procedure may be decided by the end to be communicated irrespective of the contents of the V/D bit; for the 64 Kb/sec data communication, the signal conversion procedure may always be prohibited irrespective of the bit contents and the type of the end to be communicated; and only for the 56 Kb/sec voice/data communication, the signal conversion procedure may be effected depending on the contents of the V/D bit, thereby promoting services in communication.

As has been described, the application of the voice signal converting device to digital communication networks brings about various meritorious advantages which will be described below.

In the first place, the V/D bit voice/data discrimination contained in a digital channel of, for example, 64 Kb/sec can assure the voice/data discrimination at desired sites in the network, so that it is not necessary to carry about information by the control signal and thus the voice and data can be accessed at desired sites and exchange procedures can be simplified.

In the second place, the periodic allotment of the V/D bits in the channels permits desired repetitious switchings from the voice service to the data communication or vice versa during communication, thereby dispensing with additional beforehand procedures for designating the communication modes.

In the third place, the switching period can be reduced to 125 $\mu$sec with 8 KHz sampling so that the data may possibly be transmitted during pause of the voice transmission, thus ensuring simultaneous use of voice and data and consequent highly efficient use of the digital communication path.

In the fourth place, since the V/D bit is definitely allotted, any uncertain region will not be attendant on the switching to improve efficiency and erroneous switching between the voice and data can be prevented, giving rise to high reliability.

In the fifth place, the converting device can be applied to time division multiplex communication path for multiplex use therein, and can be realized economically by making use of a shift register which has a duplex function to delay the data signal and to act as the serial-parallel conversion circuit for the voice signal conversion.

In the sixth place, the converting device can be adapted to various types of voice signal conversion by simply changing the contents of the code conversion table in the voice signal conversion memory, thus assuring high versatility of the device.

In the seventh place, where a called subscriber has both a telephone and a data terminal, the reception signal can be discriminated on the reception terminal side as to whether the reception signal is directed to the telephone terminal or the data terminal by utilizing the incoming V/D bit attendant on the voice signal or the data signal and therefore necessity for reception of a particular switching signal from the exchange network can advantageously be eliminated.

In the eighth place, the voice communication can be assured without affecting the speech quality by using the $2^0$ bit corresponding to the least significant bit in the PCM 8-bit code as the V/D bit for voice/data discrimination.

We claim:

1. A voice signal converting device adapted for a digital communication network which handles digitized voice signals and data signals simultaneously comprising:
    means for detecting a discrimination bit from a signal coming to an incoming digital communication path, said discrimination bit being set in a digital signal channel for discriminating whether a bit group corresponding to that discrimination bit represents a voice signal or a data signal;
    means for converting the bit group in the digital signal channel coming to said incoming digital communication path into a predeterminedly correlated bit group; and
    means responsive to results of detection by said detecting means so that when the bit group corresponding to the discrimination bit represents the voice signal, the correlated bit group resulting from the conversion by said converting means is selected and delivered to an outgoing digital communication path and when the bit group corresponding to the discrimination bit represents the data signal, this bit group in its original form is selected and delivered out.

2. A voice signal converting device according to claim 1, wherein said converting means comprises:
    serial-parallel conversion means for serially receiving the bit group in the digital signal channel coming to said incoming digital communication path and producing a parallel output;
    a conversion memory for receiving an input bit group in the form of the parallel output from the serial-parallel conversion means and converting the input bit group into an output bit group which is correlated to the input bit group pursuant to a predetermined arithmetic law and then delivered out of the memory; and
    parallel-serial conversion means for serially transmitting the output bit group from said conversion memory onto the outgoing digital communication path.

3. A voice signal converting device according to claim 2, wherein said conversion memory comprises a read only memory for accommodating a code conversion table which receives, as an address input, the input bit group in terms of a first coding system and delivers, as a data output, the output bit group in terms of a second coding system corresponding to the address input.

4. A voice signal converting device according to claim 2, which further comprises a shift register for delaying the signal coming to the incoming digital communication path by a predetermined delay and producing a delayed output, said shift register being used as said serial-parallel conversion means incorporated in said converting means.

5. A voice signal converting device according to claim 1, wherein said detecting means comprises a flip-flop which latches said discrimination bit in the signal coming to the incoming digital communication path in response to a clock signal which is synchronized with the allotment of the discrimination bit set in the digital signal channel.

6. A voice and data signal transmission system for use in a digital communication network in which digitized voice signals and data signals are treated simultaneously comprising:
    (a) means for applying to each time slot within a channel corresponding to a service call a bit for discriminating whether the signal in communication is a voice signal or a data signal when communication is established between terminal units via the digital communication network;
    (b) a plurality of voice signal converting means each including means for detecting the discrimination bit from each signal time slot coming to an incoming digital communication path, converter means for converting a bit group in the digital signal channel coming to said incoming digital communication path into a predeterminedly correlated bit group pursuant to a predetermined arithmetic law, and means responsive to results of detection by said detecting means so that when the bit group corresponding to the discrimination bit represents the voice signal, the correlated bit group resulting from the conversion by said converter means is selected and delivered to an outgoing digital communication path and when the bit group corresponding to the discrimination bit represents the data signal, this bit group in its original form is selected and delivered out, the type of said plurality of voice signal converting means being determined in accordance with the arithmetic law of said converter means; and
    (c) means for selectively connecting one of the various types of voice signal converting means pursuant to a desired arithmetic law in a digital link connecting terminal units in communication.

7. A transmission system according to claim 6, wherein said discrimination bit applying means allots the discrimination bit to the least significant bit of a PCM 8-bit code in the channel corresponding to the service call, whereby the remaining 7 bits represent the voice signal or the data signal.

8. A transmission system according to claim 6, wherein said various types of voice signal converting means are connected in a digital multiplex communication path and adapted for multiplex use for a plurality of multiplex channels.

9. A transmission system according to claim 6, wherein said selective connection means determines the voice signal converting means to be selectively connected in accordance with area of the calling terminal unit and the called terminal unit.

10. A voice signal converting device adapted for a digital communication network capable of transmission and reception by effecting switching between digitized voice signal and data signal during one communication as desired comprising:

an incoming digital communication path connected to a first unit for transmitting a digital signal, for transmitting the digital signal fed from the first unit with inclusion in each time slot of an information section of a predetermined number of bits representing the voice signal or the data signal and a coding section of a predetermined bit number indicating that information in the information section represents either the voice signal or the data signal;

means for detecting the coding section in the digital signal being transmitted to the incoming digital communication path;

selective conversion means responsive to results of detection by said detecting means so that when the information section corresponding to the coding section in the same time slot represents the voice signal, a bit group in said information section is converted into a predeterminedly correlated bit group and delivered out and when said information section represents the data signal, the bit group in said information section is delivered out in its original form; and an outcoming digital communication path connected to a second unit for receiving the digital signal, for transmitting the information section and the coding section corresponding thereto delivered from said selective conversion means with these sections included in the same time slot in response to the coding section sent from said incoming digital communication path.

* * * * *